United States Patent
Patil et al.

(10) Patent No.: US 7,191,592 B2
(45) Date of Patent: Mar. 20, 2007

(54) DIESEL ENGINE EXHAUST SYSTEM

(75) Inventors: Mallanagouda D. Patil, Corning, NY (US); Jimmie L. Williams, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 61 days.

(21) Appl. No.: 10/878,711

(22) Filed: Jun. 28, 2004

(65) Prior Publication Data
US 2005/0284142 A1    Dec. 29, 2005

(51) Int. Cl.
*F01N 3/00* (2006.01)
*F01N 3/02* (2006.01)

(52) U.S. Cl. .............. 60/297; 60/289; 60/311

(58) Field of Classification Search ........... 60/297, 60/288, 311, 307
See application file for complete search history.

(56) References Cited

U.S. PATENT DOCUMENTS

| | | | |
|---|---|---|---|
| 4,276,066 A | 6/1981 | Bly | 55/287 |
| 4,383,411 A | 5/1983 | Riddel | 60/303 |
| 4,544,388 A | 10/1985 | Rao | 55/282 |
| 4,902,309 A | 2/1990 | Hempenstall | 95/95 |
| 5,347,809 A | 9/1994 | Moeckel | 60/274 |
| 5,397,550 A | 3/1995 | Marino, Jr. | 422/178 |
| 5,517,848 A | 5/1996 | Hosoya | 73/23 |
| 5,619,853 A | 4/1997 | Brown | 60/288 |
| 5,657,626 A | 8/1997 | Brown | 60/274 |
| 5,693,294 A * | 12/1997 | Anderson et al. | 422/171 |
| 5,716,586 A | 2/1998 | Taniguchi | 422/173 |
| 5,809,361 A * | 9/1998 | Nomura et al. | 396/542 |
| 5,850,734 A * | 12/1998 | Ketcham | 60/274 |
| 5,863,311 A * | 1/1999 | Nagai et al. | 55/483 |
| 6,696,132 B2 * | 2/2004 | Beall et al. | 428/116 |
| 6,698,192 B2 * | 3/2004 | Ootake | 60/297 |
| 2004/0083716 A1 * | 5/2004 | Twigg | 60/284 |

OTHER PUBLICATIONS

Twenty-Seventh Edition Machinery's Handbook, 2004, Industrial Press, 27th Edition, p. 428.*

* cited by examiner

*Primary Examiner*—Thomas Denion
*Assistant Examiner*—Loren Edwards
(74) *Attorney, Agent, or Firm*—Kees van der Sterre

(57) ABSTRACT

Apparatus and a method for controlling gas flow into a combustion engine exhaust gas filter e.g., to control filter temperatures during filter regeneration, comprising providing a fluidic exhaust stream diverter proximate to and centrally of the inlet face of the filter and activating the fluidic diverter to divert exhaust gas flow away from central filter portions toward peripheral filter portions.

8 Claims, 4 Drawing Sheets

DIESEL ENGINE EXHAUST SYSTEM

BACKGROUND OF THE INVENTION

The present invention relates to systems for the removal of particulate material from diesel engine exhaust streams, and more particularly to exhaust systems utilizing porous ceramic diesel exhaust filters of honeycomb configuration to filter carbonaceous particulates (soot) from the exhaust stream prior to release into the atmosphere.

Ceramic honeycomb particulate filters or traps have proven to be extremely efficient at removing carbon soot from the exhaust of diesel engines. Such filters are generally of so-called wall-flow design in that the soot is separated from the engine exhaust stream by capture on the porous channel walls of a honeycomb filter body as the exhaust gases are forced through those walls in traversing from an array of filter inlet channels to an adjacently interspersed array of filter outlet channels. Wall-flow filters can be designed to provide for nearly complete filtration of soot without significantly hindering the exhaust flow.

In the normal course of using such a filter in the manner described, a layer of soot collects on the surfaces of the filter inlet channels. The reduced wall permeability caused by the presence of this soot layer increases the pressure drop across the filter and thus increases back pressure in the engine exhaust system. This causes the engine to work harder and adversely affects engine operating efficiency.

This soot-induced pressure drop periodically increases to a point where regeneration of the filter becomes necessary. Regeneration typically involves heating the filter to initiate the combustion and removal by oxidation of the carbon soot layer. Desirably this regeneration is accomplished under controlled conditions of engine management involving a slow burn of the soot deposits over a period of several minutes. The temperature in the filter during such regeneration can rise from about 400–600° C. to a maximum of about 800–1000° C.

Under certain circumstances, however, a so-called "uncontrolled regeneration" can occur, wherein soot combustion is initiated coincidentally with or immediately preceding a period of engine idle at low exhaust gas flows and relatively oxygen-rich conditions. In that case the combustion of the soot may produce large temperature gradients and temperature spikes much higher than 1000° C., which can thermally shock and crack, or even melt, the filter.

In addition to capturing the carbon soot, the filter also traps metal oxide "ash" particles that are carried by the exhaust gas. These particles are not combustible and, therefore, are not removed during regeneration. If temperatures during an uncontrolled regeneration are sufficiently high, the ash can sinter to the filter and/or react with the filter to initiate partial melting.

In view of these circumstances the development of filter designs and engine control systems that can better manage the regeneration cycle and improve the resistance of these ceramic exhaust filters to thermal regeneration damage continues to be a major focus of diesel engine exhaust system engineering effort.

SUMMARY OF THE INVENTION

The present invention provides a method and apparatus for controlling filter operation and regeneration in a diesel engine exhaust emissions control system. In accordance with the invention, the distribution of combustible particulates (soot) within the filter can be better managed, and the thermal gradients developed in the course of soot combustion during filter regeneration can be controlled.

A central feature of the invention is the use of fluidic control means for directing gas flow through ceramic soot filters. Such control means can affect soot distribution within the filter or, more importantly, can modify and moderate the soot combustion process during regeneration. Thus the temperature peaks and gradients arising during such regeneration are reduced.

In a first aspect, then, the invention comprises a method for controlling gas flow into a combustion engine exhaust gas filter. In accordance with that method a fluidic exhaust stream diverter is positioned proximate to an inlet face of the filter, typically on or adjacent to the longitudinal filter axis. The longitudinal filter axis is a geometric axis traversing the geometric center of the inlet face of the filter in a direction parallel with the direction of exhaust gas flow into and through that filter. The fluidic diverter is thereafter activated, for example during filter regeneration, to divert gas flow toward the filter periphery and away from an axial portion of the filter disposed on and proximate to the longitudinal filter axis.

Depending upon the temperature and/or composition of the gas being supplied to the filter during regeneration, the effects of this gas diversion can include initiating, sustaining and/or relatively accelerating the process of soot combustion proceeding within peripheral portions of the filter. On the other hand, the soot combustion process occurring in axial portions of the filter can be significantly moderated.

In a second aspect, the invention includes apparatus for the treatment of diesel engine exhaust gas offering improved operational flexibility and service life. The apparatus of the invention is an engine exhaust emissions control system comprising, first, a wall flow filter formed of porous ceramic material disposed in a housing having inlet and outlet ports, the inlet port being connected to an exhaust conduit from an engine. The ceramic filter, most typically a honeycomb filter with alternately plugged channels, has a longitudinal filter axis traversing the geometric center of the inlet face of the filter in a direction parallel with the orientation of the channels and the direction of exhaust gas flow into and through the filter.

Further included in the apparatus of the invention is a fluidic diverter for pneumatically controlling the flow of exhaust gases into the filter. The fluidic diverter comprises a diverter gas source located exteriorly of the housing and a diverter gas conduit having a gas inlet connected to that source for delivering the diverter gas to a diverter gas outlet within the housing. Also provided within the housing, and integral with or adjacent to the diverter gas outlet, is a gas deflection element positioned proximate to the inlet face of the filter and on or adjacent to the longitudinal filter axis thereof. The deflection element is positioned and configured to redirect diverter gas exiting the gas outlet in directions having flow components transverse to the inlet face of the filter. Thus, when the fluidic diverter is activated, the redirected diverter gas pneumatically obstructs the flow of exhaust stream gases into the central portion of the filter inlet face.

DESCRIPTION OF THE DRAWINGS

The invention is further described below with reference to the appended drawings, wherein:

FIG. 6. plots exhaust gas inlet velocity data versus inlet face position for a wall flow filter system as in FIG. 2 and FIG. 7. presents qualitative plots of exhaust gas inlet velocity versus radial position for a wall flow filter system such as shown in FIGS. 4–4a.

DETAILED DESCRIPTION

Figure 1:
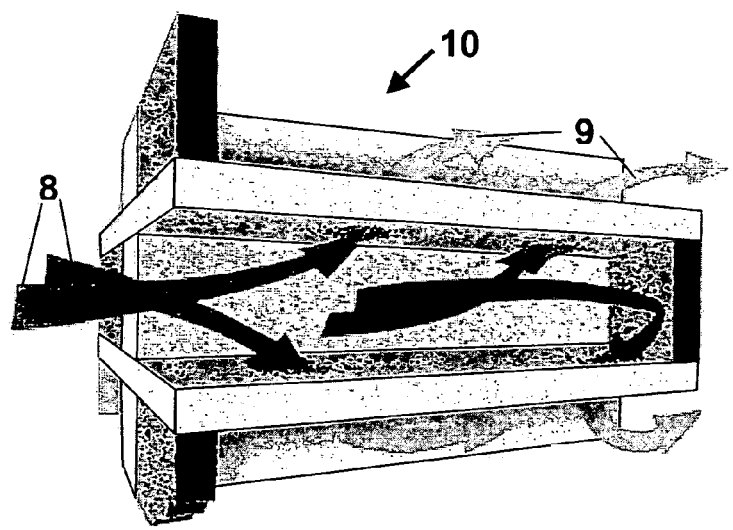
FIG. 1 schematically represents exhaust gas filtration through a ceramic wall flow filter.

In the operation of a ceramic honeycomb wall flow filter, soot accumulates on the walls of the filter inlet channels over the course of engine operation, and the resulting soot accumulations cannot be effectively removed except by combustion during a regeneration cycle. FIG. 1 of the drawing illustrates the process of soot accumulation, in the course of which engine exhaust gases indicated by arrows 8 are filtered to produce processed exhaust gases 9 via passage through the porous channel walls of ceramic filter 10, shown in partial cross-section.

Figure 2:
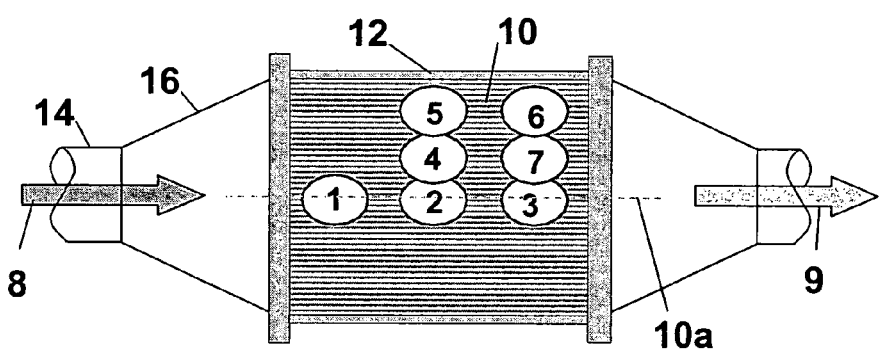
FIG. 2 illustrates an exhaust filter system for evaluating wall flow filter performance.

The central problem addressed by the invention is filter damage resulting from the severe temperatures reached along axial sections of ceramic exhaust filters as soot accumulations are burned in the course of filter regeneration. The severity of these temperatures may be evaluated through the use of apparatus such as schematically illustrated in FIG. 2 of the drawing. Generally, FIG. 2 schematically illustrates an experimental setup wherein a diesel engine exhaust filter has been fitted with thermocouples to record filter temperatures reached in the course of a regeneration cycle.

Referring more particularly to FIG. 2, a porous ceramic wall flow filter 10 is disposed within a housing 12 connected to an exhaust conduit 14 which delivers engine exhaust gases into the housing via inlet cone 16. Filter 10 is provided with thermocouples 1–7 for the purpose of recording filter operating and regeneration temperatures. Thermocouples at locations 1, 2 and 3 within the filter are disposed along the filter longitudinal axis 10a, while thermocouples at locations 4–7 are disposed in peripheral filter locations. With this instrumentation, temperatures and thermal gradients along the filter longitudinal axis as well as transverse to that axis in radial directions, can be measured.

Figure 3:
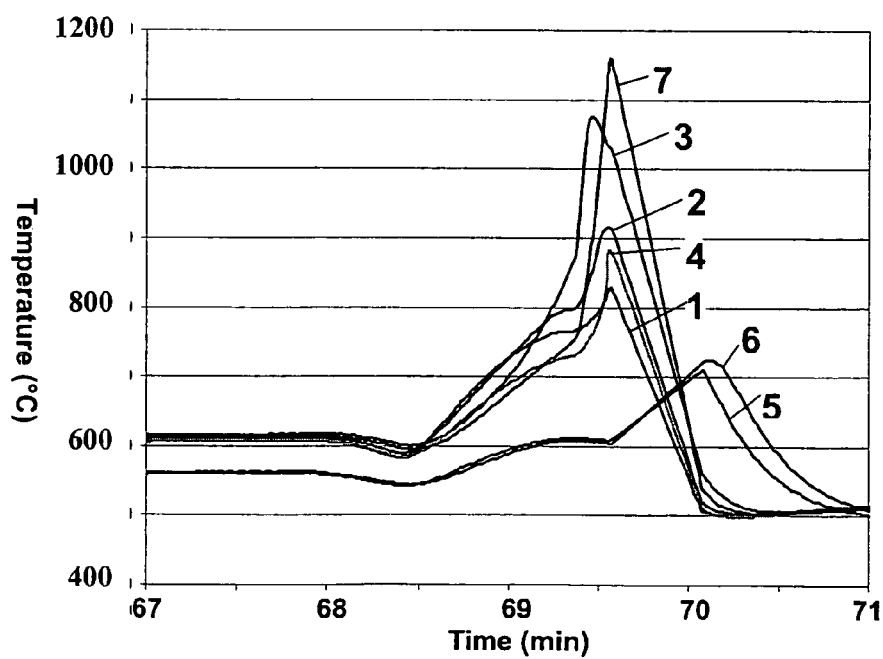
FIG. 3 graphs wall flow filter operating temperatures during a filter regeneration cycle.

The thermal response of such a filter during a typical regeneration cycle is illustrated in FIG. 3 of the drawings. FIG. 3 is a plot of filter temperatures as a function of engine operating time in minutes, measured at thermocouple locations 1–7 in the filter of FIG. 3 in the course of an uncontrolled regeneration cycle. That cycle was initiated at relatively low engine speeds and lasted about 2 minutes.

Peak regeneration temperatures are reached within the filter beginning approximately midway through the regeneration cycle, at an elapsed engine operating time of about 69.5 minutes. The highest peak filter temperatures are observed at thermocouple locations 3 and 7 in FIG. 3, while the temperatures reached in peripheral thermocouple locations such as at thermocouples 5 and 6 remain relatively low. The data shown in FIG. 3 were generated during the testing of a filter of cordierite (magnesium aluminosilicate) composition, but similar thermal profiles have been observed in other materials being developed for use as engine exhaust filters, including, for example, silicon carbide, silicon nitride, alumina, aluminum titanate, spodumene, and other carbide, nitride and/or oxide ceramics.

The peak temperatures reached in some sections of these filters are thus high enough to approach the safe operating limits of common filter construction materials. Just as significantly, the large thermal gradients arising between those locations and the more moderate temperatures at the peripheral thermocouple locations introduce thermal stresses that, depending on the design and composition of the filter, can result in filter cracking.

Figure 4:
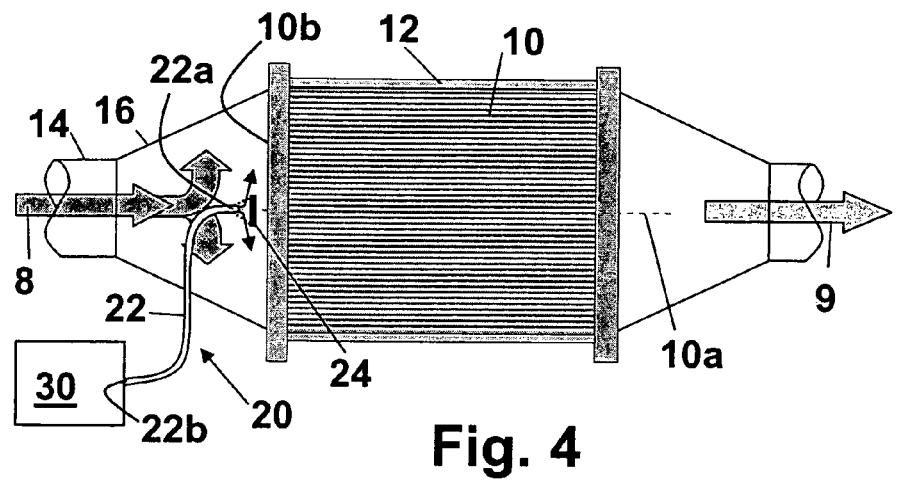
FIGS. 4 and 4a illustrate fluidic diverter apparatus for controlling exhaust gas flow during a filter regeneration cycle.
Figure 4A:
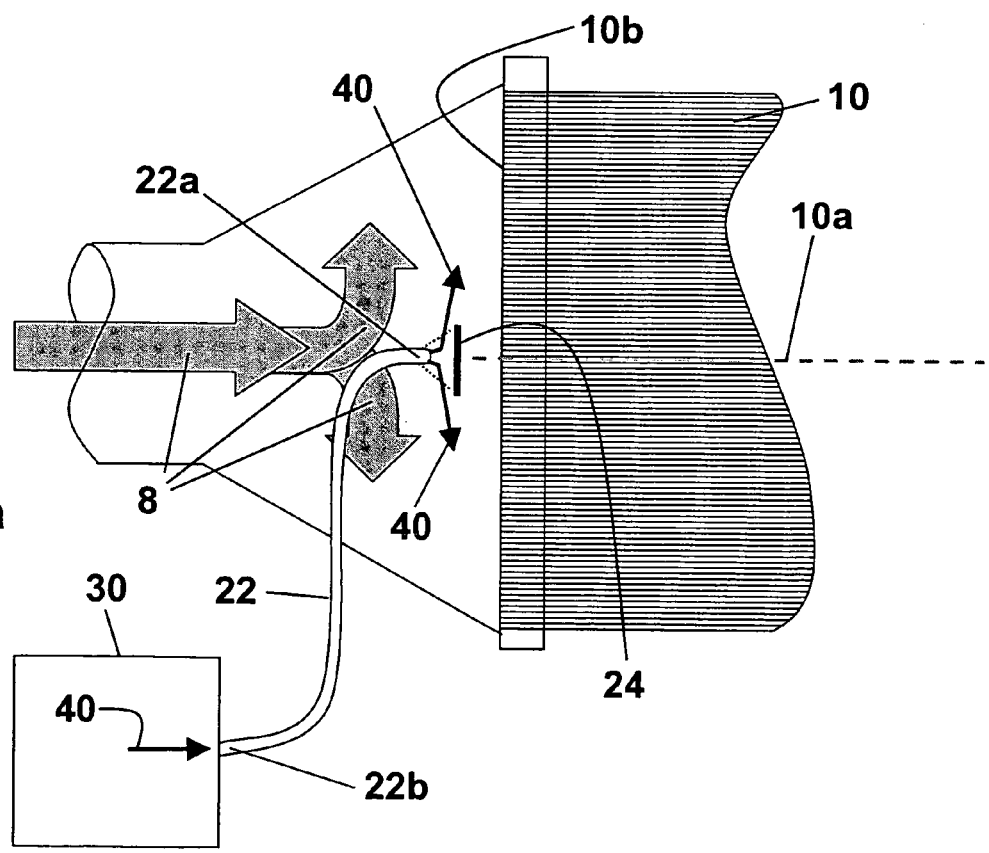

FIGS. 4 and 4a of the drawing schematically illustrate fluidic diverter apparatus in accordance with the invention that is suitable for moderating the regeneration behavior shown in FIGS. 2 and 3. As shown in FIG. 4, a porous ceramic wall flow filter 10 is in FIG. 2 is disposed within a housing 12 that is connected to an exhaust conduit 14 for delivering engine exhaust gases into the housing via inlet cone 16. In this embodiment, however, a fluidic diverter 20 is additionally provided that is adapted for operation in conjunction with filter 10 and housing 12 to provide means for pneumatically controlling the flow of engine exhaust gases toward the filter.

As shown in FIG. 4, and in the partial enlargement thereof schematically illustrated in FIG. 4a, diverter 20 includes a gas conduit 22 having a diverter gas inlet 22b connected to a diverter gas source 30 located outside of the housing and a diverter gas outlet 22a located within the housing and proximate to filter inlet face 10b. Positioned adjacent gas outlet 22a on filter longitudinal axis 10a is a gas deflection element 24, that element also being proximate to filter inlet face 10b and being arranged so that diverter gas from gas outlet 22a may impinge thereupon.

During the intervals of operation of fluidic diverter 20, diverter gas supplied from gas source 30 is conveyed through gas conduit 22 and discharged at a predetermined velocity from gas outlet 22a, where it impinges upon deflection element 24. That impingement deflects the diverter gas in gas flow directions 40, those flow directions having flow components parallel with the plane of filter inlet face 10b and transverse to the initial flow direction of exhaust gas stream 8. The deflected diverter gas thereby pneumatically obstructs the flow of exhaust stream gases 8 toward the central portion of filter inlet face 10b, as a result of which the flow of exhaust stream gases 8 toward peripheral portions of the filter inlet face is relatively increased.

Although it may be employed for a variety of different control purposes, a particularly effective use of the fluidic diverter system of FIGS. 4 and 4a is at the commencement of the regeneration cycle, when supplemental fuel injections or other means may be employed to develop high exhaust stream temperatures. Such temperatures are a convenient way of initiating the combustion of accumulated soot to start a filter regeneration process.

The activation of fluidic exhaust stream diversion to redirect this combustion-initiating gas flow has the beneficial effect of causing soot combustion to commence first in peripheral portions of the exhaust filter. This early combustion, in combination with the initiating high exhaust stream temperatures, has the effect of preheating peripheral portions of the filter and thereby significantly reducing the thermal gradients that develop during the subsequent combustion of axial soot deposits.

While activation of the diverter is most typically limited to regeneration cycle control, it may also be activated between filter regenerations, for example to redirect exhaust into peripheral filter portions to adjust soot distribution within the filter. More uniform accumulated soot distributions tend also to reduce the thermal gradients developed during filter regeneration.

The composition of the diverter gas is not critical, and in fact may be modified to further control the regeneration process depending upon the particular performance objectives to be secured in each case. For example, air or other oxygen-containing diverter gases can accelerate soot oxidation in the filter periphery, while nitrogen or other inert gas enrichment of the diverter stream can retard such oxidation. The use of low flows of oxygen-deficient diverter gas, in volumes insufficient to strongly impede axial exhaust stream flow, can be helpful to moderate the rate of axial soot combustion and thereby further reduce thermal gradients and/or peak regeneration temperatures within the filter.

The design of the fluidic diverter may of course vary depending upon the particular demands of the system to be implemented. In the embodiment of FIGS. 4 and 4b the diverter gas outlet and deflection element are spaced from each other, but diverter designs wherein the diverter gas outlets are integral with (e.g., machined into) a suitable deflection element, may be preferred for some applications. Examples of integrated devices include customized gas nozzles designed to eject gas streams in radial directions from a location central to the filter inlet face.

One important limitation on diverter design relates to the maximum size of the deflector component or components relative to the size of the filter inlet face. Overly large deflectors are not useful because they impede exhaust gas flow even when inactive, and thereby undesirably increase the steady state exhaust backpressure of the exhaust system. In general, fluidic diverter designs wherein the gas deflection element has a cross-sectional area transverse to the filter axis that does not exceed 10% of the area of the filter inlet face should be used. The positioning of the gas deflection element will also depend on filter and exhaust system design, but will generally be in the range of 0.2–5 cm from the front face of the filter.

The invention is further described below with reference to specific implementations thereof, which are intended to be illustrative rather than limiting.

EXAMPLE 1

Prior Art System

In a gas flow modeling experiment, a diesel particulate filter of porous ceramic composition, such as a cordierite wall-flow filter with alternate channels plugged in a checkerboard pattern, is modeled to generate a gas flow profile map for a simulated exhaust gas flowing therethrough. The evaluation is carried out for the case of a filter mounted in an enclosure provided with a conical gas inlet cone substantially as illustrated in FIG. 2 of the drawing.

The wall-flow filter selected for evaluation is in the shape of a right circular cylinder with flow channels parallel with the cylinder axis, the filter having a cylinder diameter of 22.86 cm and a cylinder length of 30.5 cm. The exhaust gas flow is delivered from an exhaust gas conduit of 10.16 cm diameter at an exhaust gas mass flow of 1100 kg/hr and at an exhaust gas temperature of 250° C.

Figure 5:
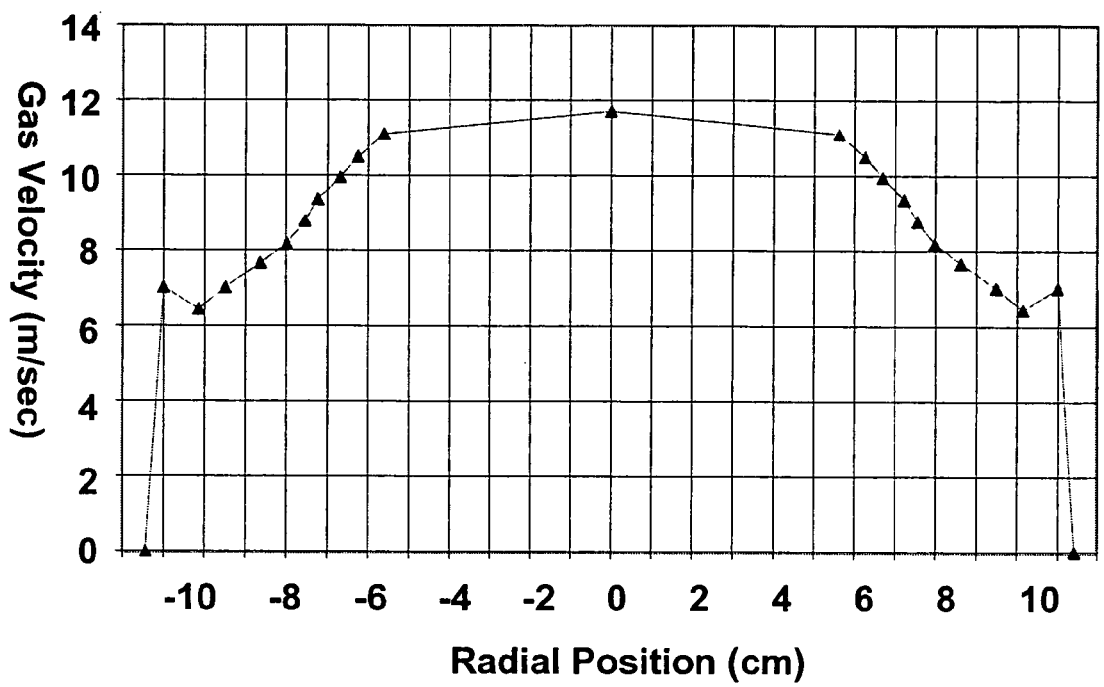
FIG. 5 models exhaust gas inlet velocity versus radial position for a wall flow filter system as in FIG. 2.

FIG. 5 of the drawing plots the exhaust gas inlet flow profile developed under these flow conditions as determined from computational fluid dynamic calculations. The filter outlet profiles are assumed to be equivalent to the inlet flow profiles since filter wall porosity is not such as to significantly affect the flow profile through the filter.

As expected, the flow profile thus generated is characterized by a high flow velocity (~11.5 m/s) at and proximate to the center axis of the filter, that axis being disposed directly across the inlet cone from the inlet exhaust gas conduit. Flow velocities are found to decrease steadily toward the filter periphery, reaching levels that are only half of the axial flow velocities at locations proximate to the filter edge.

Figure 6:
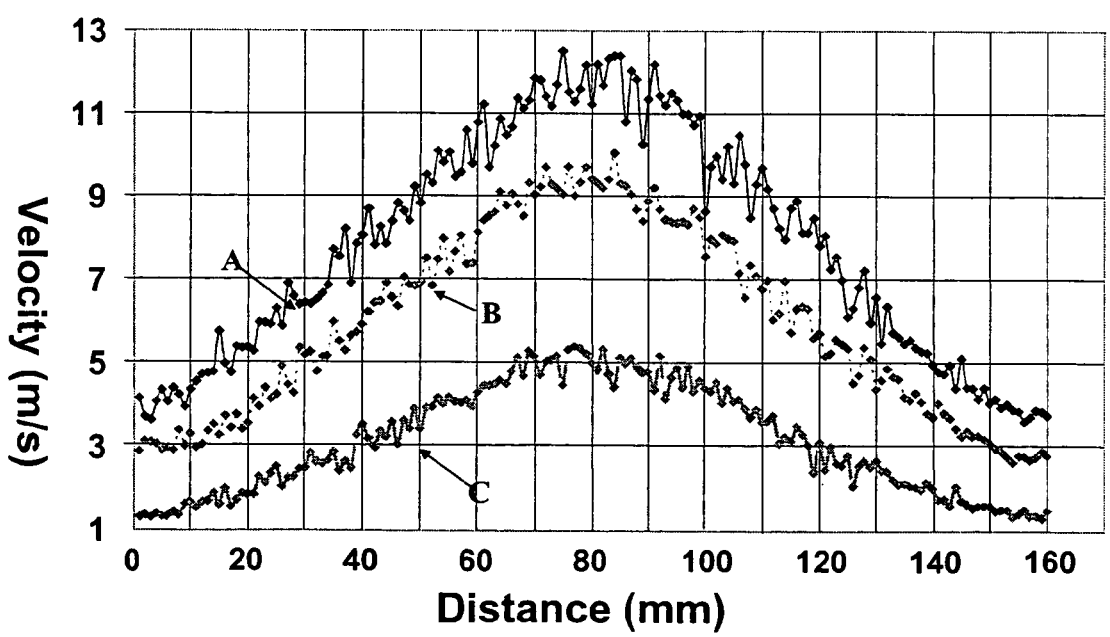

The foregoing computational data correlate well with data collected during flow velocity measurements conducted on porous ceramic wall flow filters of similar size and design while undergoing testing in similarly configured diesel engine exhaust systems. FIG. 6 of the drawings plots exhaust gas flow velocity as a function of location on the filter inlet face for a plugged porous cordierite ceramic diesel exhaust particulate filter of 16 cm diameter and 18 cm length under three different inlet conditions. The filter design tested had a cell density of 15.5 channels/cm$^2$ (100 channels/inch$^2$) and a channel wall thickness of 0.43 mm (0.017 inches). The plots reflect flow profile data at three different exhaust gas inlet flow rates A, B and C through an exhaust inlet pipe of 2.16 cm diameter, i.e., at 66, 47 and 23 liters/sec (140, 100, and 50 cfm), respectively. The data correlate inlet flow velocities in m/s with vertical distance from the top edge of the filter inlet face in cm, as measured with a Dantec constant temperature anemometer sampling downward through the cylinder center axis to the bottom filter edge.

The relatively high axial flow velocities at all three inlet flow rates are apparent from these data, and are generally consistent with the higher accumulations of soot and other particulates typically observed in central regions of these filters. Another less apparent effect of high center gas flow is that the combustion of soot during regeneration generally initiates in these central regions, and is most rapid in those regions. This early and severe combustion increases the levels of thermal stress developed in the early stages of the regeneration cycle.

EXAMPLE 2

Fluidic Flow Control System

A prophetic example of the performance of a diesel engine exhaust system design such as illustrated in FIGS. 4–4a of the drawing is developed from the known flow profile characteristics of a porous ceramic wall flow filter such as disclosed above in Example 1. Data from the testing of fluidic flow control systems of the type previously used to control flow through honeycomb exhaust hydrocarbon adsorbers provides a basis from which qualitative plots of gas flow profile through wall flow filters under various diverter air flows can be generated.

The wall-flow filter used as a model for the evaluation is again in the shape of a right circular cylinder with flow channels parallel with the cylinder axis, the filter having a cylinder diameter of 22.86 cm and a cylinder length of 30.5 cm. The exhaust gas flow for inlet to this filter is delivered from an exhaust gas conduit of 10.16 cm diameter at an exhaust gas mass flow of 1100 kg/hr and at an exhaust gas temperature of 250° C.

To control exhaust gas inlet flow velocities in this system a fluidic diverter plate consisting of a circular metal disc of 2 cm diameter is positioned at a spacing of 1 cm from the front face of the filter, the disc being centered on the cylinder axis and oriented with respect to the filter substantially as shown for plate 24 in FIG. 4a of the drawing. With this diverter plate in place, qualitative projections of exhaust gas inlet flow velocity across the face of the filter are developed for the case of low (A), moderate (B), and high (C) flows of diverter air, at air flows (STP) of 57, 142, and 227 liters/min (2, 5, and 8 f$^3$/min), respectively. As this diverter air impinges against the center of the plate it is diverted in directions transverse to the flow direction of inlet exhaust in the manner indicated by arrows 40 in FIG. 4a, thus diverting exhaust gas flow as indicated by arrows 8 in FIG. 4a.

Figure 7:
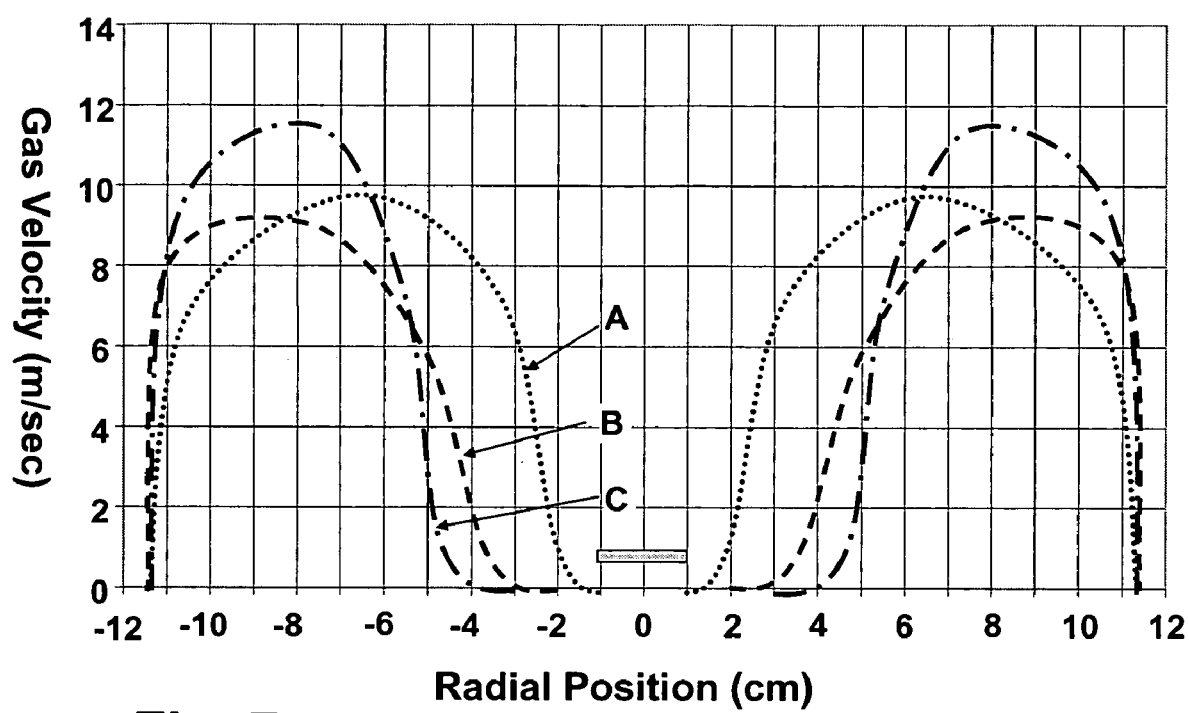

FIG. 7 of the drawings presents qualitative plots of predicted exhaust flow profiles under exhaust and diverter air flow conditions (A), (B) and (C) such as described above. The manner in which fluidic diverter air flow redirects exhaust flow away from the filter center axis, thereby reducing central inlet flow velocities and relatively increasing flow through peripheral filter regions, is apparent from these plot. In particular, as fluidic air flow velocity increases, the inlet flow profile of the filter changes and larger proportions of the exhaust gas are redirected through the periphery of the filter.

It will be apparent from this description that the flow control system as described can be used to modify exhaust gas inlet flow profiles at various stages of engine operation. However, the preferred application is for controlling filter inlet gas flow at the time of initiating filter regeneration, since it is at the start of and during regeneration that modified gas flows will be most effective in regulating soot combustion conditions within the filter. Modes of operation that will initiate soot combustion in peripheral rather than central regions of the filter may be particularly preferred.

We claim:

1. A method for controlling gas flow into a combustion engine exhaust gas filter which comprises:
   providing a fluidic exhaust stream diverter proximate to an inlet face of the filter, the filter being a ceramic honeycomb wall-flow filter for separating soot from an engine exhaust stream by capture on porous channel walls of the filter as the exhaust stream is forced through said walls in traversing from an array of filter inlet channels to an adjacently interspersed array of filter outlet channels,
   the diverter being positioned on or adjacent to a longitudinal filter axis, the filter axis being oriented parallel to the direction of exhaust gas flow into the filter and substantially centrally of an inlet face thereof; and
   activating the fluidic diverter to divert exhaust gas flow away from an axial portion of the filter disposed on or proximate to the longitudinal filter axis.

2. A method in accordance with claim 1 wherein the step of activating the fluidic diverter comprises the step of impinging a flow of diverter gas onto a gas deflection element for redirecting the flow of diverter gas in directions having a flow component parallel with the inlet face of the filter.

3. A method in accordance with claim 1 wherein the exhaust gas flow diverted away from the axial segment of the filter includes a pre-heated gas stream having a temperature sufficient to ignite carbonaceous particulate matter present in the filter.

4. A method in accordance with claim 2 wherein the diverter gas comprises oxygen.

5. A method in accordance with claim 2 wherein the diverter gas comprises nitrogen or carbon dioxide.

6. Apparatus for treating a combustion engine exhaust gas stream comprising:
   a ceramic honeycomb wall flow filter having a longitudinal filter axis disposed in a housing connected to an exhaust conduit from an engine, the filter separating soot from the exhaust gas stream by capture on porous channel walls of the filter as the exhaust stream is forced through said walls in traversing from an array of filter inlet channels to an adjacently interspersed array of filter outlet channels, the filter axis being oriented parallel to the direction of exhaust gas flow into the filter and substantially centrally of an inlet face thereof; and
   a fluidic diverter comprising a diverter gas source located exteriorly of the housing, a diverter gas conduit having a diverter gas inlet connected to the source and a diverter gas outlet disposed within the housing, and a gas deflection element integral with or adjacent to the diverter gas outlet, the gas deflection element being positioned proximate to the inlet face of the filter and on or adjacent to the longitudinal filter axis.

7. Apparatus in accordance with claim 6 wherein the gas deflection element is positioned and configured to redirect diverter gas exiting the gas outlet in directions having flow components transverse to the inlet face of the filter.

8. Apparatus in accordance with claim 7 wherein the cross-sectional area of the gas deflection element in a plane transverse to the filter longitudinal axis does not exceed 10% of the area of the filter inlet face.

* * * * *

UNITED STATES PATENT AND TRADEMARK OFFICE
CERTIFICATE OF CORRECTION

| | |
|---|---|
| PATENT NO. | : 7,191,592 B2 |
| APPLICATION NO. | : 10/878711 |
| DATED | : March 20, 2007 |
| INVENTOR(S) | : Mallanagouda Dyamanagouda Patil et al. |

It is certified that error appears in the above-identified patent and that said Letters Patent is hereby corrected as shown below:

| No. | Col. | Line | Description |
|---|---|---|---|
| 1 | 2 | | On the Title page item [30] please include --Foreign Patent Documents EP1312776-- |

Signed and Sealed this

Twenty-sixth Day of June, 2007

JON W. DUDAS
*Director of the United States Patent and Trademark Office*